United States Patent [19]

Mihara

[11] Patent Number: 5,969,208
[45] Date of Patent: Oct. 19, 1999

[54] METHOD OF MAKING POLLUTANT HARMLESS AND APPARATUS FOR CONDUCTING THE METHOD

[75] Inventor: Ryohei Mihara, 6-24, Minamihiraki 2-Chome, Nishinari-Ku, Osaka, Japan

[73] Assignees: Hiromichi Tamaki, Wakayama; Hisao Tsuruta; Ryohei Mihara, Osaka, all of Japan

[21] Appl. No.: 09/128,747

[22] Filed: Aug. 4, 1998

[30] Foreign Application Priority Data

Jul. 17, 1997 [JP] Japan .................................. 10-203195

[51] Int. Cl.⁶ .............................. A62D 3/00; B09B 3/00; B01D 53/34; B02C 11/08
[52] U.S. Cl. .......................... 588/205; 588/207; 588/213; 588/231; 588/234; 588/240; 588/245; 588/253; 588/256; 588/900; 423/659; 423/DIG. 9; 241/5; 241/23
[58] Field of Search .............................. 423/659, DIG. 9; 241/5, 23, 24.1; 588/18, 200, 205, 106, 107, 109, 210, 212, 213, 215, 216, 227, 228, 231, 234, 238, 240, 245, 252, 253, 256, 261, 900

*Primary Examiner*—Gary P. Straub
*Assistant Examiner*—Eileen E. Nave
*Attorney, Agent, or Firm*—Knobbe, Martens, Olson & Bear, LLP

[57] ABSTRACT

This invention relates to a method of making a pollutant harmless by treating a material to be treated containing the pollutant. The method comprises the steps of: heating the material in a pressure resistant vessel hermetically to obtain a heated material; supplying the heated material from the vessel to a nozzle; and jetting out the material from the nozzle to collide against a collecting member arranged opposite to the nozzle.

2 Claims, 2 Drawing Sheets

FIG._1

METHOD OF MAKING POLLUTANT HARMLESS AND APPARATUS FOR CONDUCTING THE METHOD

BACKGROUND OF THE INVENTION

1. Field of the Invention

This invention relates to a method of making a pollutant such as an exhaust gas, a polluted water and soil or the like harmless and to an apparatus conducting the method.

2. Description of Related Art

Recently, environmental problems have been caused by pollution of air and soil due to dioxin generated by burning a waste, pollution of rivers, lakes and marshes due to a waste acid or alkali or the like, pollution of an underground water due to a waste water from a factory containing a solvent such as an organic chlorine compound (for example, trichloroethylene, tetrachloroethylene), pollution of soil due to mercury, cadmium, lead, zinc, cyanogen, arsenic, chromium, copper, fluorides, an organic chlorine compound or the like.

Conventionally, the polluted water has been treated by neutralizing, while the polluted soil has been treated by burning or burying.

However, the burying treatment is wrong because a new secondary pollution may be caused. Further, a method, in which the polluted soil is melted with taking a long time and then cracked (vitrified), requires a long treatment period and a high treatment cost.

SUMMARY OF THE INVENTION

It is, therefore, an object of the invention to provide a novel method of making a pollutant harmless, which is simple, economical, and short in the treatment period.

According to the first aspect of the invention, there is the provision of a method of making a pollutant harmless by treating a material to be treated containing the pollutant, which comprises the steps of: heating the material in a pressure resistant vessel hermetically to obtain a heated material; supplying the heated material from the vessel to a nozzle; and jetting out the material from the nozzle to collide against a collecting member arranged opposite to the nozzle.

According to the second aspect of the invention, there is the provision of an apparatus for making a pollutant harmless by treating a material containing the pollutant, which comprises a pressure resistant vessel for heating the material hermetically, a nozzle for being supplied with the heated material from the vessel and for jetting out the supplied material, and a collecting member arranged opposite to the nozzle.

In general, the material to be treated may be a polluted gas, a polluted water, a mixture of an exhaust gas and the polluted water, or a polluted soil.

In the heated and pressured vessel exists a water solution, gas or soil having a high temperature and pressure. In a pressure resistant vessel a process of holding a state of a high temperature and pressure is called a hydrothermal process, in which an activity of a molecular species is extremely high and physical and chemical properties of the content in the vessel largely change, compared with a solution method under ambient temperature. Such a content under the water vapor saturating or supersaturating state is jetted out from the vessel through the nozzle to collide against the collecting member. Thereby, harmful organic substances such as dioxin or harmful low molecular weight compounds, contained in the polluted soil, the polluted water or the exhaust gas, is decomposed to generate gaseous molecules. The gas is then collected and subjected to a known active carbon treatment or a neutralization treatment, if necessary. On the other hand, the polluted soil becomes vitrified, so that a heavy metal in the soil becomes harmless because it is confined in the vitrified soil.

BRIEF DESCRIPTION OF THE DRAWINGS

The invention will be described with reference to the accompanying drawings, wherein.

DESCRIPTION OF THE PREFERRED EMBODIMENT

Figure 1:
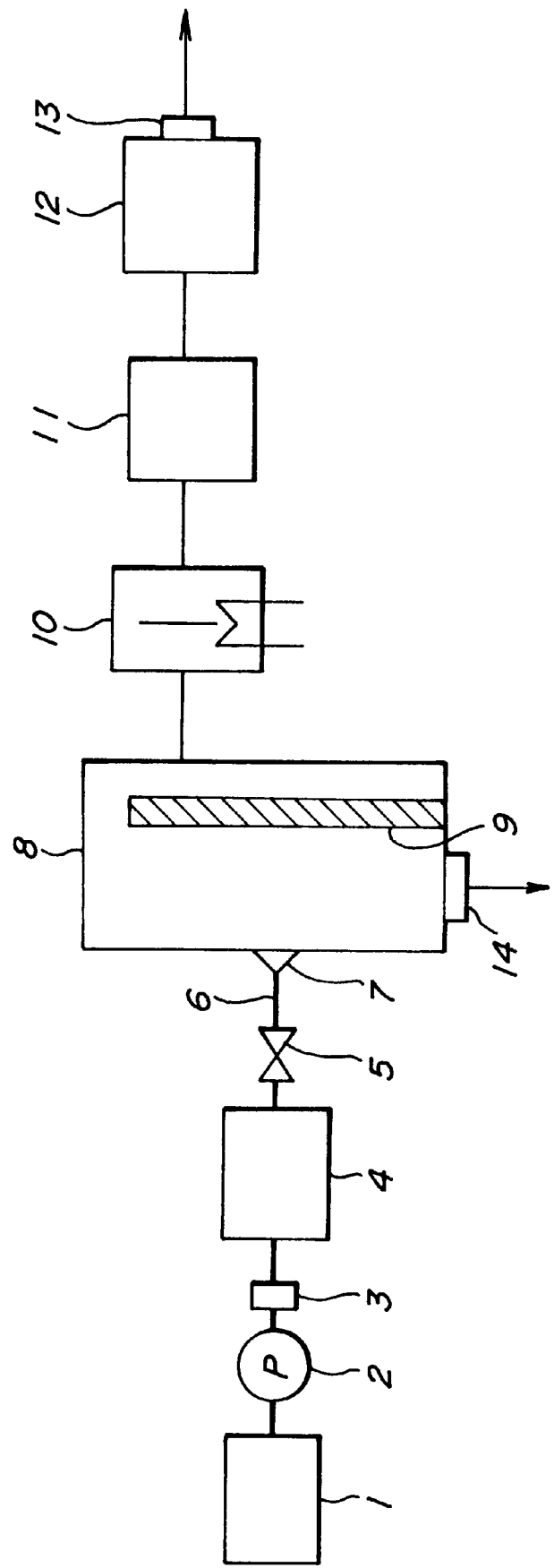
FIG. 1 is a block diagram showing treating processes in Examples according to the invention.
Figure 2:
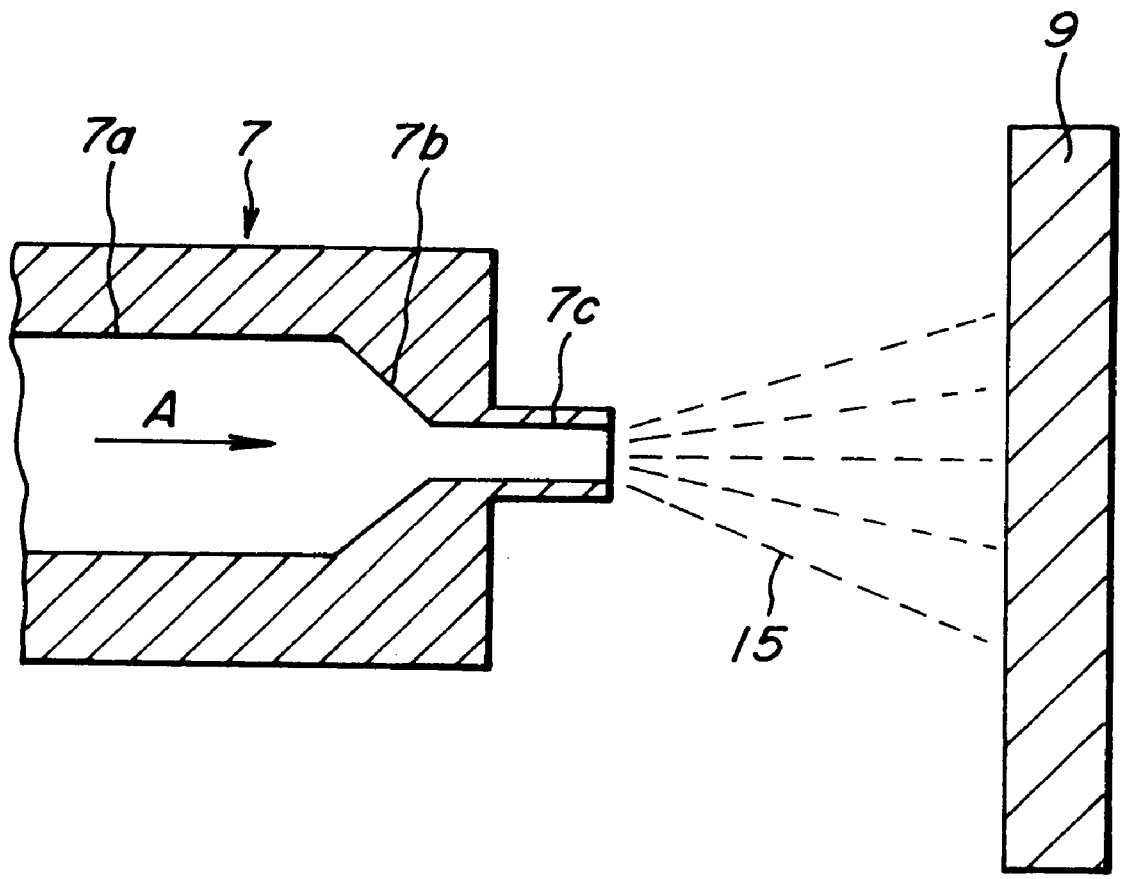
FIG. 2 is a sectional view showing an example of a nozzle 7 and collecting member in Examples according to the invention.

The invention will be concretely explained below referring to FIGS. 1 and 2.

A material to be treated is put in a pressure resistant vessel 1 and preheated to, for example, 100–150° C. under 20–30 kg/cm$^2$. In the vessel 1 if no another pressure resistant vessel, or in another pressure resistant vessel 4 after transferring the material to the vessel 4 by means of a pump 2 or the like, the material is put under a water vapor saturated or supersaturated state (a critical state) and held for 1 or 2 seconds, by heating and pressing it, under 250–300° C. and 250–300 kg/cm$^2$ when it is gas or liquid, while under 250–450° C. and 250–350 kg/cm$^2$ when it is solid. It is theoretically preferable to be not less than 274° C. because of being capable of putting it under the supersaturated state. Subsequently, by opening a valve 5 provided at the forward portion of the vessel and flowing the material through a pipe 6 connecting the valve 5 to the nozzle 7, the material is jetted out to expand from a nozzle 7. The jetted-out material then collides against a collecting member 9 arranged in a collecting container 8. If a temperature and pressure in the pressure resistant vessel are too low, the expansion of the jetted-out material becomes insufficient, while if being too high, the requirements for the treatment apparatuses become severe; therefore, ranges mentioned above are particularly preferable.

In order to decompose all the harmful substances such as dioxin or the like, for example, only by heating and pressing them, a high temperature and pressure of as much as not less than 650° C. and 600 atm are required. According to the invention the purpose can be accomplished at a temperature and pressure much lower than the above ones.

After colliding, all the liquid and gas become gas or the soil becomes vitrified. The gas is subsequently released into an atmosphere, after being preferably passed through an alkaline water and active carbon respectively.

A method of heating particularly has no limitation, and an electric heater, LP gas or the like can be used. Further, the collecting member preferably has a collecting plane, more preferably being a collecting plate. The collecting member is made of a heat and pressure resistant ceramic, a metal (particularly iron). As the pressure resistant vessel, a known pressure resistant vessel of a batch or continuous type can be used. The nozzle preferably has a diameter of 1–20 mm and is a heat and pressure resistant ceramic nozzle. A temperature of the collecting surface may be preferably so high that a harmful organic compound can be decomposed, preferably 1000–1300° C.

Example 1

There are prepared 5 g of biphenyl, 5 g of monochlorobenzene, 5 g of trichlorobenzene, 500 g of hydrogen peroxide, 1000 g of pure water and 1485 g of n-hexane, whose reagents amount to 3 kg. These reagents are used as a model pollutive system because they produce dioxin by burning or heating them. These reagents are mixed under 25° C. and 1 atm to obtain a polluted mixture solution. The mixture is poured into a preheating vessel 1 and subjected to 150° C. and 20 kg/cm$^2$. Subsequently, the mixture is transferred to a pressure vessel 4 by means of a pump 2 through a regulator 3 and subjected to 450° C. and 300 kg/cm$^2$. After maintaining the temperature and pressure for 1 second, a valve 5 is opened.

A collecting plate has a thickness of 100 mm, a height of 1000 mm and a width of 1000 mm. A nozzle 7 comprises a main body portion 7a, an inner diameter tapered portion 7b and an outlet 7c. The mixture passes through a pipe 6 heated to 450–480° C. and flows in the nozzle 7 as shown an arrow A, and finally jets out from the outlet 7c to expand. It then collides against a collecting plate 9 heated to 1000° C., and evaporates at the same time. A reference 15 indicates the jetted-out mixture. The evaporated gas is cooled by means of a condenser 10 to about 45–55° C. Thereby, a cooled gas and liquid are produced. The cooled gas passes through an alkaline water bath 11 and a subsequent active carbon bath 12, and is released from a gas releasing port 13 into an atmosphere.

On the other hand, the cooled liquid is diluted with n-hexane to measure concentrations of benzene (aromatic) species and dioxin species in the diluted solution by an ECD/GC method (a gas chromatography). As a result, the concentration of the benzene species is 0.002 mg/l, and the dioxin species is not detected.

Example 2

2 kg of a polluted soil is obtained by mixing 5 g of biphenyl, 5 g of monochlorobenzene, 5 g of trichlorobenzene, 985 g of pure water with 1000 g of soil. The polluted soil is put in the preheating vessel 1 and subjected to 150° C. and 20 kg/cm$^2$. Subsequently, the soil is transferred to the pressure vessel 4 by means of the pump 2 through the regulator 3 and subjected to 450° C. and 300 kg/cm$^2$. After maintaining the temperature and pressure for 2 seconds, the valve 5 is opened. Thereby, the soil passes through the pipe 6 heated to 450–480° C. and jets out from the outlet 7c to expand. It then collides against the collecting plate 9 at 1000° C. By colliding, the soil portion is verified and the liquid portion evaporates. The verified (cracked) soil drops on a bottom of the vessel 8 and is removed from an outlet 14 provided at a lower portion of the vessel 8, and then cooled. On the other hand, the evaporated gas passes through the condenser 10, the alkaline water bath 11 and the active carbon bath 12 and is released from a gas releasing port 13 into an atmosphere.

An amount of the obtained cracked soil is 80 g. The produced liquid is diluted with n-hexane to measure a concentration of benzene species in the diluted solution by the ECD/GC method. As a result, the benzene species are not detected.

Example 3

The same 3 kg of polluted mixture as in Example 1 is treated in the same manner as in Examples 1 and 2, except that the mixture is subjected to a temperature of 450° C. and a pressure of 400 kg/cm$^2$ to make it supersaturated (critical) state in the pressure resistant vessel 4.

The resultant cooled liquid is diluted with n-hexane to measure a concentration of benzene species in the diluted solution by the ECD/GC method. Its result shows 0.0004 mg/m$^3$.

What is claimed is:

1. A method of making a pollutant harmless by treating a material to be treated containing the pollutant, which comprises the steps of:

heating the material maintained at a temperature of at least 1000° C. and in a pressure resistant vessel hermetically to obtain a heated material;

supplying the heated material from the vessel to a nozzle; and jetting out the material from the nozzle to collide against a collecting member arranged opposite to the nozzle.

2. A method of making a pollutant harmless according to claim 1, wherein the material is selected from a group consisting of a gas, liquid or solid containing one or more pollutants selected from the group consisting of dioxin, waste acid or alkali, organic chlorine compounds, mercury, cadmium, lead, zinc, cyanogen, arsenic, chromium, copper, fluorides, biphenyl, hydrogen peroxide and n-hexane.

* * * * *

UNITED STATES PATENT AND TRADEMARK OFFICE
CERTIFICATE OF CORRECTION

PATENT NO. : 5,969,208

DATED : October 19, 1999

INVENTOR(S): Ryohei Mihara

It is certified that error appears in the above-identified patent and that said Letters Patent is hereby corrected as shown below:

Column 4, line 33, delete "maintained at a temperature of at least 1000°C. and" and insert --to a temperature range of from 250°C to 480°C--;

Column 4, line 38, after "member" insert --maintained at a temperature of at least 1000°C and--.

Signed and Sealed this

Third Day of April, 2001

*Attest:*

NICHOLAS P. GODICI

*Attesting Officer*  Acting Director of the United States Patent and Trademark Office

UNITED STATES PATENT AND TRADEMARK OFFICE
CERTIFICATE OF CORRECTION

PATENT NO.    : 5,969,208
DATED         : October 19, 1999
INVENTOR(S)   : Ryohei Mihara It is certified that error appears in the above-identified patent and that said Letters Patent is hereby corrected as shown below:

Column 4,
Line 32, delete "maintained at a temperature of at least 1000ºC. and" and insert -- to a temperature range of from 250ºC to 480ºC --;
Line 38, after member insert the phrase -- maintained at a temperature of at least 1000ºC and --.

Signed and Sealed this

Twenty-eighth Day of October, 2003

JAMES E. ROGAN
*Director of the United States Patent and Trademark Office*